United States Patent
Cesario, Jr.

(10) Patent No.: US 7,412,046 B1
(45) Date of Patent: *Aug. 12, 2008

(54) CUSTOMER RELATIONSHIP MANAGEMENT FOR CUSTOMER SERVICE REQUESTS

(75) Inventor: James C Cesario, Jr., Augusta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/532,474

(22) Filed: Sep. 15, 2006

Related U.S. Application Data

(63) Continuation of application No. 10/365,922, filed on Feb. 13, 2003, now Pat. No. 7,110,522.

(51) Int. Cl.
*H04M 3/42* (2006.01)
(52) U.S. Cl. .................. 379/201.12; 379/207.02; 379/265.01; 379/265.02
(58) Field of Classification Search ............ 379/207.02, 379/221.08, 265.01, 265.02, 265.11, 265.13, 379/201.01, 201.12
See application file for complete search history.

(56) References Cited

U.S. PATENT DOCUMENTS

| 5,701,301 | A | 12/1997 | Weisser, Jr. |
|---|---|---|---|
| 5,838,774 | A | 11/1998 | Weisser, Jr. |
| 6,700,965 | B1 | 3/2004 | Ferrer et al. |
| 6,804,346 | B1 | 10/2004 | Mewhinney |
| 7,110,522 | B1 * | 9/2006 | Cesario, Jr. ............ 379/265.01 |
| 2002/0122401 | A1 | 9/2002 | Xiang et al. |

OTHER PUBLICATIONS

Telcordia Technologies Performance from Experience, Customer Care and Billing, "Telcordia Customer Care, Ordering and Billing System for Emerging Carriers, A Flexible, Convergent, and Robust Solution", 2000 4 Pages.

The Customer Relationship Management Primer, "What You Need to Know to get Started", Apr. 2002, Published by crmguru.com, 42 pages.

* cited by examiner

*Primary Examiner*—Harry S Hong
(74) *Attorney, Agent, or Firm*—Greenblum & Bernstein, P.L.C.

(57) ABSTRACT

Providing customer relationship management (CRM) between a communications service operator and their customers includes obtaining information about a requested communications service requested by a customer, retrieving information about related and/or complimentary communications services to the requested service, and conveying the retrieved information to the customer. The requested service is processed upon a determination that the retrieved information was conveyed to the customer, such that processing of the requested service is contingent upon the retrieved information being conveyed to the customer.

20 Claims, 3 Drawing Sheets

CUSTOMER RELATIONSHIP MANAGEMENT FOR CUSTOMER SERVICE REQUESTS

RELATED APPLICATIONS

This application is a continuation of U.S. patent application Ser. No. 10/365,922, filed Feb. 13, 2003, which is incorporated herein by reference.

BACKGROUND

In recent years, a number of new telephone service features have been provided by an Advanced Intelligent Network (AIN). The AIN evolved out of a need to increase the capabilities of the telephone network architecture in order to meet the growing needs of telephone customers or users. The AIN architecture generally comprises two networks, a data messaging network and a circuit-switched, trunked communications network. The trunked communications network handles voice and data communications between dispersed network locations, whereas the data messaging network is provided for controlling operations of the trunked communications network.

A privacy screening service is a service that enables a subscriber to screen incoming calls. The privacy screening service provides information to the called party (in this case, the subscriber to the privacy screening service) that allows the subscriber to make an informed decision as to whether or not to answer a call. For example, a subscriber may (and typically does) use the privacy screening service to block all unidentified calls from going through. Private telephone numbers are telephone numbers that block services such as "caller ID" that would otherwise identify the caller to the called party. In telephone systems that offer private numbers and a privacy screening service to its customers, a call from a private number to a subscriber with the privacy screening service cannot be completed automatically, unless the caller authorizes the system to override the privacy of his number. When subscribing the to the many privacy services, participating customers are often not aware (and more importantly not made aware by the telecommunications service provider) of related and/or complimentary services to one or more of the sought after services. For example, a telecommunications service provider, in some instances, will offer complimentary services in an unbundled manner such that a "private" number and caller identification blocking are separate and distinct services. However, a subscribing customer who requests a private number is often under the impression that they also are provided with the caller identification blocking service, when in reality they are required by the exemplary telecommunications services provider to subscribe to the separate and distinct services. As such, there exists a very likely possibility that a customer wanting both a "private" number and caller identification blocking will only receive a "private" number.

Currently, telecommunication service providers employ customer care and billing computing applications to assist them in customer relationship management. These applications, inter alia, manage and communicate customer data, operations data, and service option data among the various participating entities of a telecommunications services company Customer service representatives employ such applications when interacting with customers to obtain and input required data to activate requested services, update customer information, track service requests, or other telecommunication services operations.

However, currently used customer care and billing computing applications (e.g. customer relationship management (CRM) protocol) do not prompt customer services representatives to offer information to requesting customers of related services. Moreover, currently employed (CRM) protocols are not designed or operate such that the customer service representative cannot proceed within the customer care and billing system unless relevant and/or complimentary services to a requested service are offered to the customer. Stated differently, currently employed CRM protocols do not force customer service representatives to provide information to customers seeking a particular service about relevant and/or complimentary services.

From the foregoing it is appreciated that there exits a need for system and methods that provide a customer relationship management (CRM) protocol that ensures that telecommunications service providers engage in significant knowledge sharing when subscribing customers to a private number service such that complimentary and/or related services are discussed and waived by subscribing customers. The system and methods described herein overcome the shortcomings of the prior art.

SUMMARY OF THE INVENTION

A system and methods for enhanced customer relationship management for telecommunication service providers ensuring customers seeking private numbers are made aware of related services such that the customer can make purchasing decisions from position of knowledge. In an illustrative implementation, a customer care and billing computing application is provided having a customer relationship management protocol directed to providing information for services related to "private" number service requests. In operation, a customer service representative employing one or more portions of the exemplary customer care and billing system interacts with interested customers seeking to obtain a "private" telephone number. As part of establishing the "private" number service, the participating customer service representative is prompted by one or more portions of the exemplary customer care and billing computing application to engage a customer relationship management (CRM) protocol directed to providing the customer information about complimentary services to the "private" number service (e.g. caller identification blocking service "per line" block service). The CRM protocol may comprise any aural and/or visual description of related and/or complimentary services, and/or the electronic communication of related and/or complimentary services. Moreover, in operation, the customer service representative must engage in the customer relationship management protocol before a new "private" number service is activated.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings the herein described systems and methods. As should be understood, however, the invention is not limited to the precise arrangements and instrumentalities shown. In the drawings.

DETAILED DESCRIPTION OF AN ILLUSTRATIVE IMPLEMENTATION

Customer Relationship Management (CRM) Overview

Customer relationship management (CRM) is a business strategy to select and manage the most valuable customer relationships. Generally, CRM requires a customer-centric business philosophy and culture to support effective marketing, sales, and service processes. CRM entails the creation, development, and implementation of various protocols that are designed to optimize and foster the customer relationship between the vendor and the customer. These protocols, inter alia, describe the steps to be performed when interacting with customers to ensure staying customer satisfaction.

CRM solutions generally comprise at least one computing component that takes the form of a computing application. This computing application, in some instances, comprise one or more portions of an enterprise's information technology deployment. In such cases, the CRM protocols are integrated within a customer service computing application. Customer service representatives employ these customer service computing applications as part of customer service activities. In operation, intended CRM protocols are leveraged to customers through the customer service representatives following prompts from customer service computing applications. For example, an enterprise may design, deploy, and implement a CRM protocol that gathers customer demographic information about subscribing customers in an effort to determine customer affinities. Such CRM protocol may be deployed as a part of a customer service computing application employed by customer service representatives. When interacting with customers, customer service representatives are prompted by the customer service computing application to the required customer service demographic information to properly execute the CRM protocol.

In this context, the systems and methods described herein aim to ameliorate the shortcomings of existing practices by providing a CRM protocol for integration within a telecommunications services provider customer care and billing computing application that prompt customer service operators to engage in relevant knowledge sharing for complimentary and/or relevant services when subscribing customers to a "private" number service. Specifically, the CRM protocol of the systems and methods described herein ensure that telecommunications service providers disclose unbundled related and/or complimentary services to the "private" number service such as caller identification number blocking (e.g. per-line blocking service).

Advanced Intelligent Network (AIN) System

Referring now to the figures, a preferred embodiment of the system and method of the present invention will be described. Basic telephony concepts and terminology are used throughout the description as would be understood by one of skill in the art.

Figure 1:
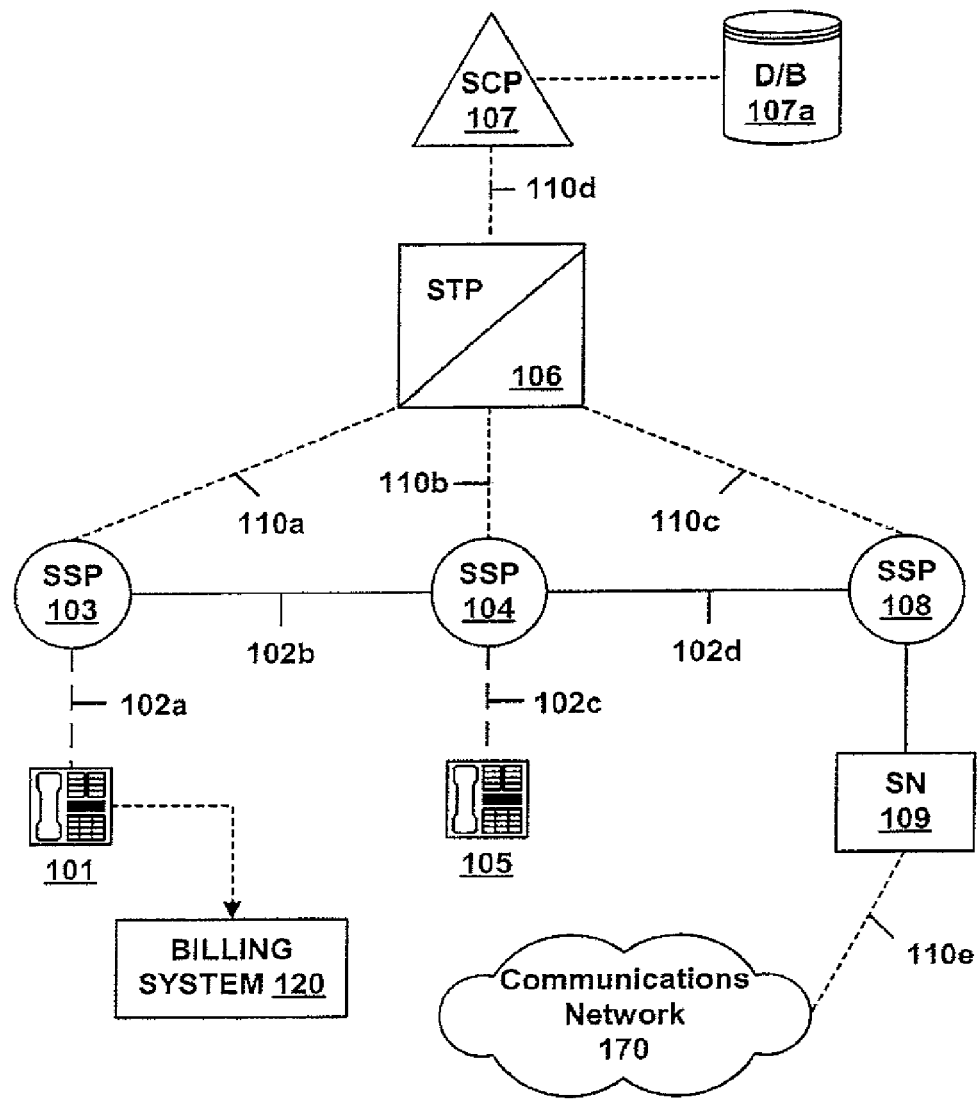
FIG. 1 illustrates, in a general block diagram form, an Advanced Intelligent Network (AIN) based system for implementing intelligent network management features, such as those which may be employed in connection with the present invention.

Referring now to FIG. 1, there is shown an exemplary telecommunication network. This exemplary environment is the public switched telecommunications network (PSTN). A portion of the PSTN is illustrated in FIG. 1 and is generally described below.

According to an aspect of the present invention, a system and method for caller detection of privacy screening may be implemented for an AIN or AIN-type network using a computer telephony system. The Advanced Intelligent Network system is described in U.S. Pat. No. 5,701,301 and U.S. Pat. No. 5,838,774, which are hereby incorporated by reference.

In particular, an AIN network with advanced intelligent network capabilities may be utilized to implement the various features and aspects of the invention. It should be noted, however, that the implementation of the present invention is not limited to AIN-based networks and other advanced or intelligent networks and arrangements may be used to implement the invention.

Referring now to the accompanying drawings, FIG. 1 illustrates a simplified AIN-based network arrangement incorporating the various features of the invention, as further described below. The AIN includes a variety of interconnected network elements. A group of such network elements includes a plurality of central offices (COs) 103, 104, 108 capable of generating AIN queries. Central Offices are also called service switching points (SSPs). A central office or SSP is a switch and the terms are used interchangeably herein. SSPs 103, 104 and 108 may comprise, for example DMS100, 5ESS or EWSD switches. These switches may be manufactured by, for example, Lucent Technologies, Inc., Nortel Networks or Siemens, respectively.

As further illustrated in FIG. 1, SSPs 103, 104 and 108 have a plurality of subscriber lines 102*a* and 102*c* connected thereto. Each SSP serves a designated group of subscriber lines, and thus, the SSPs 103, 104 or 108 that serves a particular line may be referred to as its serving switch. Each line is connected typically to a piece of terminating equipment including a plurality of telephones designated, e.g., as 101 and 105. Although telephones are illustrated as the pieces of terminating equipment in FIG. 1, those skilled in the art will understand that such pieces include other telecommunications devices such as facsimile machines, computers, modems, etc.

Records of calls are maintained so that telephone users can be billed for the calls made. For example, calls made from one state to another state are typically billed at a long distance rate. Calls made from one message unit to another message unit are typically billed at a local toll call rate. Calls using special services such as return call (e.g., a telephone customer can dial "*69" to call the number of the last person to call the customer) are typically billed at a specified amount per use or a fixed rate per month. Information on the billing record typically includes the calling party (typically the party who will be billed for the call), the called party number (which determines the rate at which the call will be billed) and the service, if any, used to make the call. SSPs 103, 104 and 108 typically are associated with the transmission of billing records to a billing system 120. Information concerning the calling telephone directory number, the called telephone directory number and the type of service utilized in the call is typically included in the billing record sent by an SSP 103, 104 and 108 to billing system 120.

In the embodiment of FIG. 1, the system includes a first telephone station which for illustrative purposes will be referred to as telephone station 101 and a second telephone station 105. SSPs 103, 104 and 108 are interconnected by a plurality of trunk circuits 102*b* and 102*d*. These are the voice path trunks that interconnect the SSPs to connect communications. The term "communication" or "call" is used herein to include all messages that may be exchanged between caller and called party in the network illustrated in FIG. 1. Trunks 102*b* and 102*d* may be either a SS7 controlled or multi-frequency trunk (MF) and the type of trunk will be in accordance with both the sending and receiving SSP to which it is connected.

In the example shown in FIG. 1, each switch may include different types of facilities and/or triggers. SSPs 103, 104 and 108 are each programmable switches which may perform the following functions: recognize AIN-type calls, launch queries to service control point (SCP) 107, and receive commands and data from, for example, SCP 107 to further process and route AIN-type calls. When one of SSPs 103, 104 and 108 is triggered by an AIN-type call, the triggered SSP 103, 104 and 108 formulates and sends an AIN query. Based on the reply from the AIN type call, SSP 103, 104, and 108 responds to call processing instructions from the network element in which the AIN service logic resides. According to an aspect of the invention, the AIN service logic may reside at SCP 107.

Each of SSPs 103, 104 and 108 is connected to a signal transfer point (STP) 106 via respective data links 110*a*, 110*b* and 110*c*. In order to facilitate signaling and data messaging, each SSP 103, 104, and 108 may be equipped with Common Channel Signaling (CCS) capabilities, e.g., SS7, which provides two-way communications of data messages over CCS links 110*a*, 110*b* and 110*c* between components of the AIN network. In one embodiment, these data links employ a signaling protocol referred to as Signaling System 7 (SS7), which is well-known to those skilled in the art, although it should be understood that any other suitable protocol could be employed without departing from the spirit and scope of the invention.

The data messages may be formatted in accordance with the Transaction Capabilities Applications Part (TCAP). Alternatively, Integrated Service Digital Network (ISDN), Users Part (ISUP) may be used for signaling purposes between, for example, SSPs 103, 104 and 108. In such a case, SSPs 103, 104 and 108 may be equipped with the capability to map appropriate data between TCAP and ISUP protocols, and vice versa. The telephone network essentially employs an upper-level software controlled network through the STP 106 and SCPs 103, 104 and 108.

AIN SSPs 103, 104 and 108 may allow normal switch processing to be suspended at specific points in a call so that the switch may send an AIN message query via STP 106 to SCP 107. STP 106 is a signaling hub that routes packets of data over the common channel signaling network. Common channeling signaling are data communications networks laid over the system's switching network that carry data and control messages to and from and among the SSPs, STPs, and SCPs in the network. Signaling System 7 (SS7) is the protocol that runs over common channel signaling networks. A common channel signaling network using the Signaling System 7 protocol is often referred to as an SS7 network. The SS7 network carries data and control messages to the SSPs in the telephone network.

A set of triggers may be defined at SSPs 103, 104 and 108. A trigger in the AIN is an event associated with a particular call that initiates a query to be sent to SCP 107. The trigger may cause SCP 107 to access processing instructions with respect to the particular call. The results of processing at SCP 107, which may include database inquires, are sent back to SSP 103, 104 or 108 through STP 106. The return packet may include instructions to SSP 103, 104 or 108 as to how to process the call. The instructions may be to take some special action as a result of a customized calling service, enhanced feature, or subscriber service. In response, SSP 103, 104 and 108 may move through its call states, and generate further packets that are used to set up and route calls. Similar devices for routing calls among various local exchange carriers are provided by regional STPs and regional SCPs.

An example of such a trigger is an off-hook delay trigger (OHDT), which causes a query to be sent to SCP 107 when a call is made from a particular calling line. Other triggers include a termination attempt trigger (TAT), which causes a query to be sent to SCP 107 whenever an attempt is made to complete a call and a Public Office Dialing Plan (PODP) trigger, although other suitable triggers may be used.

SCP 107 may execute software based service logic and return call-processing instructions to the triggering AIN SSP. New services may be provisioned by assigning AIN SSP triggers to customer lines, trunks, and/or North American Numbering Plan (NANP) telephone numbers.

Much of the intelligence of the AIN resides in an SCP 107 that is connected to STP 106 over an SS7 or other suitable data link 110*d*. SCPs are powerful fault-tolerant computers, e.g., AT&T Star Server FT Model 3200 or AT&T Star Server FT Model 3300 computers (these and more current computers such as the Advantage P200 and Advantage 4P200 models are presently available from Lucent Technologies). SCPs are "Intelligence centers" with access to applications databases that enable the network to deliver advanced services such as caller ID, privacy screening, call forwarding and caller detection of privacy screening.

Among the functions performed by SCP 107 is the hosting of network databases that may be stored in database object 107*a*. Database object 107*a* is shown as a database communicatively coupled to SCP 107, although data storage object 107*a* may be embodied as a component within SCP 107, such as an internally-mounted hard disk device. The databases stored in data storage object 107*a* may be used in providing telecommunications services to a customer.

The SCPs also execute service package applications (SPAs) that deliver the advanced services. Typically, SCP 107 is also the repository of SPAs that are used in the application of telecommunications services, enhanced features, or subscriber services to calling lines. Additionally, SPAs may use databases for providing telecommunication services.

The system of FIG. 1 may also include a services circuit node (SCN) 109, which may also be referred to herein as services node (SN) 109. SNs are physically generally similar to SCPs, but include voice and Dual Tone Multi-Frequency (DTMF) signal recognition circuits, voice synthesizers, and voice recognition and digit collection capabilities. The operators of the telephone network can program their SNs to manage data, to respond to calls and to route calls as specified by the telephone network and to collect digits from a caller or subscriber. The SN's voice circuits can also be programmed to provide a voice response (e.g., to play pre-selected announcements) to callers and to perform voice recognition. SNs can also be programmed to respond to input from the callers by, e.g., further routing the call.

Thus SN 109 is a programmable interactive data system that can act as a switch to transfer calls. SN 109 may provide interactive help, collect voice information from participants in a call, provide notification functions and/or store subscriber data. SN 109 may be a Lucent Technologies Star Server FT Model 3200 or Model 3300 although other units may be employed without departing from the scope of the invention. SN 109 may include a data assembly interface. In addition, SN 109 may request SCP 107 to retrieve information from database 107*a* containing information concerning calling party 101, may receive information from SCP 107, may make outgoing calls to called party telephone station 105, may convert alphanumerical textual data to speech, may announce converted information retrieved from SCP 107 to called party telephone station 105 and/or may connect telephone station 101 to called party telephone station 105.

Communications link 111 between SSP 108 and SN 109 may be a primary rate interface (PRI) or basic rate interface (BRI) line or any other suitable telephone line. PRI and BRI lines are circuit-switched ISDN lines. SN 109 may be communicatively coupled to a network 170 via a data link 110e using an X25, TCP/IP or SS7 protocol or any other suitable protocol.

Accordingly, connections by links 110a, 110b, 110c, 110d and 110e are for signaling purposes and allow SSPs 103, 104 and 108 to send and receive messages to and from SCP 107 and SN 109. For purposes of illustration, various features of the present invention will now be described from the standpoint of a switch implementing AIN protocols, provisioned with OHDT (off-hook delay trigger), TAT (termination attempt trigger), or PODP (public office dialing plan) triggers. However, as will be apparent to those of ordinary skill in the art based on the disclosure provided herein, the present invention is not limited to implementation through these particular triggers and protocols and may be designed and provisioned with a network utilizing other triggers and protocols. For example, SSP 103, 104 and 108 may represent a TCP/IP telecommunications switching network gateway. One skilled in the art will further recognize that the above-described network is a simplified network meant for explanatory purposes. It is likely that a telephone network may comprise numerous user stations, SSPs, STPs, SCPs, and SNs along with other telephone network elements.

Figure 2:
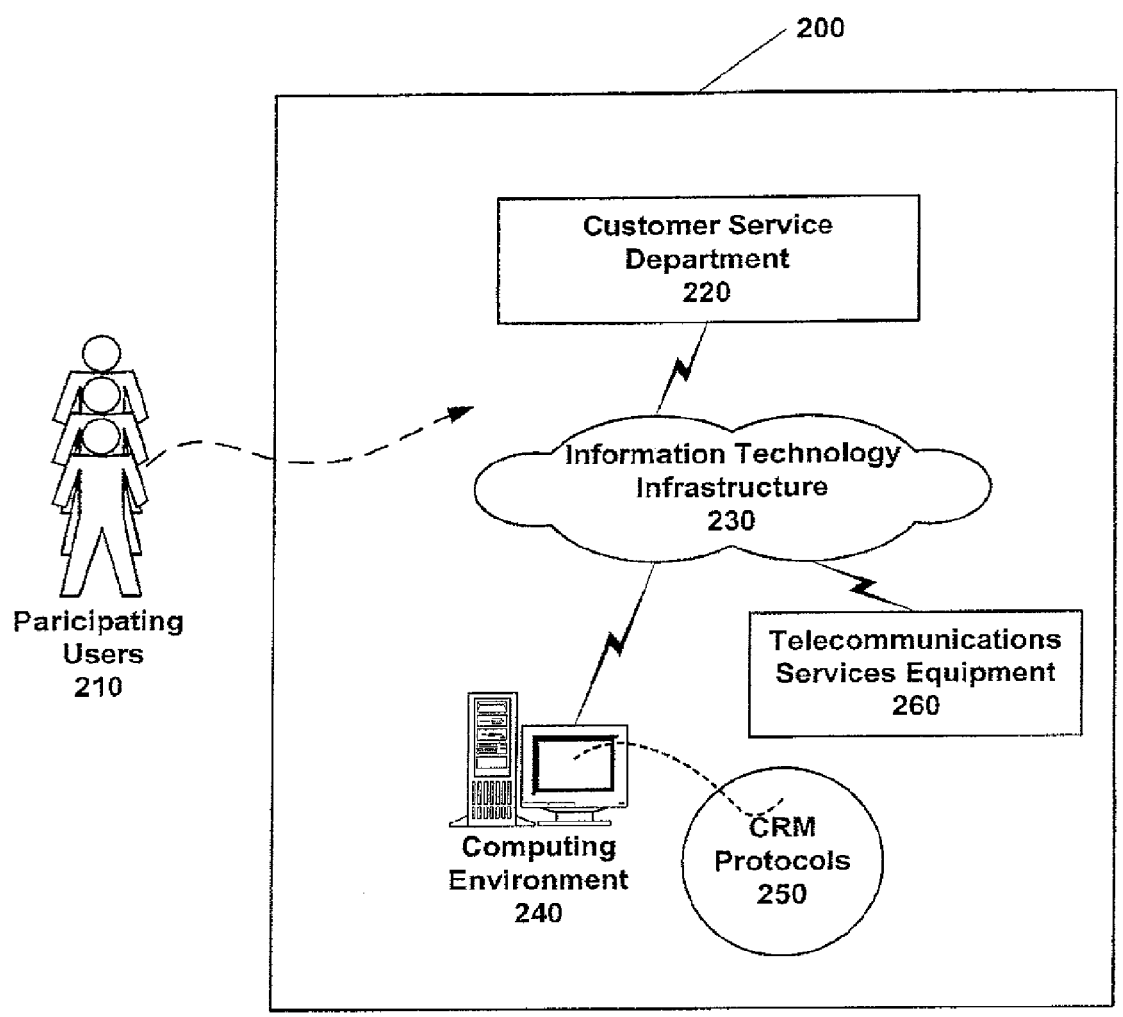
FIG. 2 is a block diagram of the interaction between exemplary components of a telecommunications services operation.

Referring now to FIG. 2, as shown, within a telecommunications service operator's enterprise 200 exists, inter alia, a customer service department 220, an information technology infrastructure 230, and telecommunications services equipment 260 for use to provide a variety of telecommunications services to participating users (e.g. customers). In addition within the telecommunications service operator's enterprise 200 exists at least one computing environment 240 executing one or more customer relationship management protocols 250. The computing environment 240 may be employed by the customer service department to fulfill customer (participating users 210) requests. In a particular implementation, computing environment 240 comprises one or more computer servers operating a customer care and billing computing application having one or more portions dedicated to customer relationship management, and specifically CRM protocols that assist the customer service department 200 to ensure proper and adequate knowledge and information sharing with customers as part of an overall and comprehensive customer service operation.

In the implementation provided, participating users 210 cooperate with the telecommunications services operator enterprise 200 to, inter alia, request information about and/or subscribe to desired telecommunications services. The participating users 210 generally interact with the customer service department 220 of the telecommunications services operator enterprise 200. Conventionally, the customer service department 220 will employ a computing application having customer relationship management protocols (e.g. a customer care and billing computing application) operating in a computing environment. In the implementation provided, customer service department 220 communicated with computing environment 240 over information technology infrastructure 230 when assisting participating users 210 in providing information about and/or subscribing them to telecommunications services.

Specifically, in accordance with the systems and methods described herein, participating users 210 interact with the customer service department 220 to request a "private line" service. The customer service department 220 employs computing environment 240 executing CRM protocols 250 to obtain the necessary information from the participating users 210 to realize the "private line" telecommunications service. When obtaining the requisite information, CRM protocols 250, through an mechanism, force the customer service department 220 to describe complimentary and/or related services to the "private line" service to the requesting participating users 210. Such mechanism may be implemented as one or more computing application interfaces (e.g. check box, pull down menu, etc.) of a cooperating customer care and billing computing application that customer service representatives (not shown) must interact with to indicate that the customer service representative (not shown) has engaged in the requisite level of knowledge sharing of complimentary and/or related telecommunications services with the participating users requesting the "private number" service. The CRM protocol 250 can operate such that the activation of the requested "private number" is contingent upon the described customer service representative's interaction with customer care and billing system. Stated differently, in the event that there is no interaction with the computing application interfaces by the customer service representatives (not shown), then the requested service (e.g. "private line" service) is not activated.

In the implementation provided, once the requisite information is obtained by the customer service representatives (not shown) according to the established CRM protocols 250, the desired service is activated for the participating users 210 who have requested the service through an interaction between the customer service department 220, computing environment 240, and telecommunications services equipment 260, all cooperating over information technology infrastructure 230. It is appreciated that although the present systems and methods have been described in context CRM protocols controlling the activation of a "private line" telecommunications service such that the "Private line" service is not activated until there is adequate knowledge sharing on complimentary and/or related services to the "private line" service such as "caller identification blocking", that the inventive concepts described herein may be applied to any telecommunication service provided by telecommunication service operators.

Figure 3:
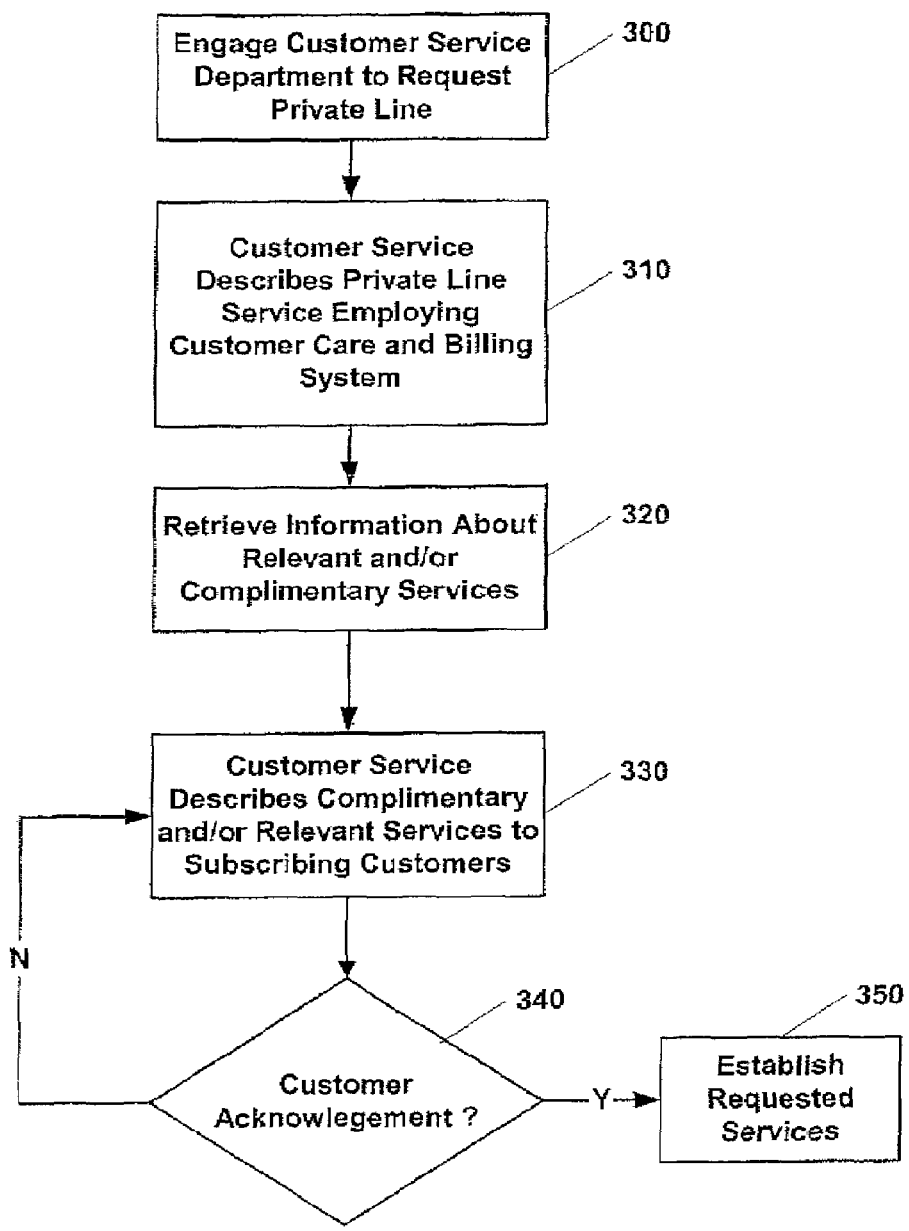
FIG. 3 is a flowchart of an exemplary process when performing the customer relationship management (CRM) protocol in accordance with the herein described system and methods.

FIG. 3 shows a flow chart of the processing performed when executing the CRM protocols of the aforementioned systems and methods. As shown, processing begins at block 300 where participating users engage a customer service department of a telecommunications services operator to request a "private line" telecommunications service. From there, processing proceeds to block 310 where the customer service department describes the "private line" telecommunications service to the requesting participating users. In operation, the customer service department may employ a customer care and billing computing application that guides the customer service department through the process of obtaining the necessary information required to activate the requested service. At block 320, information bout relevant and/or complimentary services to the requested telecommunications service (e.g. "private number" service) is retrieved and then described by the customer service department at block 330. A check is then performed at block 340 to determine whether the customer acknowledged the knowledge sharing about the relevant (related) and/or complimentary services (e.g. if a "private number" service is requested then checking to see if the customer has been told about the complimentary service of "caller identification" blocking). If the customer acknowledged the knowledge sharing, processing proceeds to block 350 where the requested service is established for the participating user. However, if the contrary is true, processing reverts to block 330 and proceeds therefrom.

What is claimed is:

1. A system controlling the sharing of information between communications services operators and their customers comprising:

a computing environment, said computing environment capable of operating a computing application having customer relationship management (CRM) features that provide the steps that are to be performed when obtaining and/or providing information between communication service customers and communication service operators; and at least one customer relationship management (CRM) protocol, the CRM protocol operating in the computing environment requiring that complimentary and/or related communication services to a requested communications service, requested by customers, be described to the customers before the requested communications service can be processed, such that processing of the requested communications service is contingent upon indication by a customer service representative that the complimentary and/or related communications services have been described to the customer.

2. The system as recited in claim 1, wherein the computing environment comprises a computer server operating a computing application having the CRM features.

3. The system as recited in claim 2, wherein the computing application comprises a communications service customer care and billing computing application.

4. The system as recited in claim 3, wherein the computing application operates in a networked computing environment.

5. The system as recited in claim 4, wherein the networked computing environment is at least one portion of an information technology infrastructure operable in a communications service operator enterprise.

6. The system as recited in claim 5, wherein the requested communications service is a "private line".

7. The system as recited in claim 6, wherein the complimentary and/or related communications service is "caller identification blocking".

8. The system as recited in claim 1, wherein description of complimentary and/or related communication services is aural.

9. The system as recited in claim 1, wherein description of complimentary and/or related communication services is visual.

10. The system as recited in claim 1, wherein description of complimentary and/or related communication services is electronic.

11. A method to ensure knowledge sharing between communications service operators and their customers such that complimentary and/or related services to a requested service are properly described to the customers at the time of subscription, comprising the steps of:

providing at least one customer relationship management protocol (CRM), the CRM protocol requiring that complimentary and/or related communication services to a requested communications service, requested by customers, be described to the customers before the requested communications service can be processed, such that processing of the requested communications service is contingent upon indication by a customer service representative that the complimentary and/or related communications services have been described to the customer; and executing the protocol by the communications services operator.

12. The method as recited in claim 11, wherein description of complimentary and/or related communication services is aural.

13. The method as recited in claim 11, wherein description of complimentary and/or related communication services is visual.

14. The method as recited in claim 11, wherein description of complimentary and/or related communication services is electronic.

15. A method providing customer relationship management (CRM) between a communications service operator and their customers, comprising the steps of:

obtaining information about a requested communications service requested by a customer;

retrieving information about related and/or complimentary communications services to the requested service;

conveying the retrieved information to the customer;

processing the requested service upon a determination that the retrieved information was conveyed to the customer, such that processing of the requested service is contingent upon the retrieved information being conveyed to the customer.

16. The method as recite in claim 15, wherein the obtaining step is performed by a customer service representative.

17. The method as recite in claim 15, wherein retrieving information about complimentary and/or related communication services comprises receiving aural description of the complimentary and/or related communication services.

18. The method as recite in claim 15, wherein retrieving information about complimentary and/or related communication services comprises receiving visual description of the complimentary and/or related communication services.

19. The method as recite in claim 15, wherein retrieving information about complimentary and/or related communication services comprises receiving electronic communication of the complimentary and/or related communication services.

20. A computer readable medium having computer readable instructions operable in a computing environment to perform the method of claim 15.

* * * * *